(12) United States Patent
Guest (10) Patent No.: US 8,444,325 B2
(45) Date of Patent: May 21, 2013

(54) CONNECTORS FOR CABLE CARRYING CONDUITS

(75) Inventor: Timothy Steven Guest, Bray (GB)

(73) Assignee: John Guest International Limited, West Drayton, Middlesex (GB)

(*) Notice: Subject to any disclaimer, the term of this patent is extended or adjusted under 35 U.S.C. 154(b) by 302 days.

(21) Appl. No.: 12/851,734

(22) Filed: Aug. 6, 2010

(65) Prior Publication Data

US 2011/0033165 A1     Feb. 10, 2011

(30) Foreign Application Priority Data

Aug. 7, 2009 (GB) .................................. 0913957.7
Dec. 18, 2009 (GB) .................................. 0922242.3
Apr. 28, 2010 (GB) .................................. 1007094.4

(51) Int. Cl.
*G02B 6/36* (2006.01)

(52) U.S. Cl.
USPC .......................................................... 385/53

(58) Field of Classification Search
None
See application file for complete search history.

(56) References Cited

U.S. PATENT DOCUMENTS

| 3,567,843 | A | * | 3/1971 | Collins et al. .................... 174/51 |
| 3,846,738 | A | * | 11/1974 | Nepovim ...................... 439/584 |
| 4,005,883 | A | | 2/1977 | Guest |
| 4,676,588 | A | | 6/1987 | Bowen et al. |
| 4,863,235 | A | * | 9/1989 | Anderson et al. ................ 385/87 |
| 5,013,124 | A | | 5/1991 | Focht |
| 5,088,804 | A | | 2/1992 | Grinderslev |
| 5,283,853 | A | * | 2/1994 | Szegda .......................... 385/139 |
| RE35,935 | E | | 10/1998 | Cabato et al. |
| 5,933,556 | A | | 8/1999 | Hawkins |
| 6,409,179 | B1 | * | 6/2002 | Daoud .......................... 277/602 |
| 7,644,959 | B2 | | 1/2010 | Guest |
| 2010/0290746 | A1 | * | 11/2010 | Bran de Leon et al. ...... 385/100 |

FOREIGN PATENT DOCUMENTS

| DE | 32 06 311 A1 | 9/1982 |
| EP | 0 136 138 | 9/1983 |
| EP | 0 285 677 | 10/1988 |
| EP | 0 349 344 | 1/1990 |
| EP | 0 363 188 A1 | 4/1990 |
| EP | 0 555 579 A1 | 8/1992 |
| EP | 1 818 702 | 8/2007 |
| GB | 1 520 742 | 8/1978 |
| JP | 2001-112142 | 4/2001 |
| WO | 94/27079 | 11/1994 |
| WO | WO 96/11355 | 4/1996 |

OTHER PUBLICATIONS

Supplemental European Search Report issued Aug. 12, 2012 in Publication No. EP 0 555 579, filed Aug. 18, 1993.

* cited by examiner

*Primary Examiner* — Sung Pak
(74) *Attorney, Agent, or Firm* — Workman Nydegger (57) ABSTRACT

A connector for a conduit for a cable (e.g. an optical fiber cable or a power cable). The connector comprises a hollow body having a throughway for the cable with a coupling for a conduit at one end and a cavity in which an annular seal is located. An actuator is provided to compress the seal radially inwardly into engagement with the cable and into engagement with said side of the cavity to block flow of fluid (gas or liquid) through the cavity and/or to grip the cable. The connector may have means to retain the actuator in the position in which it compresses the seal.

27 Claims, 7 Drawing Sheets

CONNECTORS FOR CABLE CARRYING CONDUITS

CROSS-REFERENCE TO RELATED APPLICATIONS

This application claims the priority of United Kingdom Application Serial No. 0913957.7, filed Aug. 7, 2009, United Kingdom Application Serial No. 0922242.3, filed Dec. 18, 2009, and United Kingdom Application Serial No. 1007094, filed Apr. 28, 2010, which are each incorporated herein by specific reference.

BACKGROUND OF THE INVENTION

1. The Field of the Invention

This invention relates to connectors for cable carrying conduits. The conduits may be for optical fibre or power cables and may be for joining lengths of conduit or for use at a junction where the cable enters or emerges from the conduiting.

2. The Relevant Technology

Our EP-A-1818702 discloses a tube coupling for connection in conduiting for an optical fibre cable comprising a coupling body having an open ended throughway to receive an end of the conduit for carrying a cable and a tube locking device in the open end of the throughway for locking the conduit in the coupling body. The throughway has a reduced diameter section part way along the throughway with an annular step at an end of the section facing towards the open end of the throughway to receive the end of the conduit inserted into the throughway. An annular flexible sealing member is disposed adjacent the step to be forced by an end of a tube inserted into the throughway into the reduced diameter section of the throughway. The resulting compression of the annular flexible seal forces the seal into sealing engagement with a cable extending along the throughway to provide a seal between the coupling body and cable.

WO-A-96/11355 discloses a connector for connecting to an end of a conduit tube of the type which carries fibre-optics communications cables; the connector comprising a body having a through bore through which a fibre-optic cable may pass. At least one end of the body is arranged to receive in an end of a conduit tube for carrying the cable, the body having first resilient sealing means for encircling the conduit tube and compression means for compressing the resilient sealing means against the conduit tube around its circumference so as to provide a substantially gas-tight seal between the body and the conduit tube. The body has two main body portions arranged for relative axial movement therebetween and means are provided for drawing the two main body portions together and a second resilient sealing means is disposed axially between two confronting surfaces of the two main body portions. The second resilient sealing means is compressible by tightening the two main body portions together so as to deform the second resilient sealing means radially inwardly and into sealing contact with the fibre-optic cable, thereby to form a substantially gas-tight seal between the body and the fibre-optic cable.

SUMMARY OF THE INVENTION

This invention provides a connector for a conduit for a cable (e.g. an optical fibre cable or a power cable), the connector comprising a hollow body having a throughway for the cable with a coupling for a conduit at least one end of the body and a cavity in the body having a side which the throughway opens into, an annular seal in the cavity located adjacent the side of the cavity and being co-axial with the opening for the cable to allow the cable to pass through the seal when the seal is unstressed and means to compress the seal radially inwardly into engagement with the cable and into engagement with said side of the cavity to block flow of fluid (gas or liquid) through the cavity and/or to grip the cable.

Preferably the means to compress the seal comprise an actuator located in the cavity for axial movement towards and away from said side of the cavity, the actuator having means to act on the annular seal to compress the seal radially and to force the seal against said side of the cavity with movement towards said side.

For example the actuator may comprise a sleeve having a bore to receive the seal when the sleeve is advanced towards said side of the cavity, the bore being shaped to compress the seal onto the cable and against the side of the cavity.

The bore in the sleeve may be cylindrical and may have a counter-bore at the end adjacent the seal to receive and compress the seal. Further the counter-bore in the sleeve may have a flared entry to guide the seal into the counter-bore in the sleeve.

In an alternative arrangement the bore in the sleeve may have a tapered entry or cam face to compress the seal inwardly on engagement in the bore.

In the latter case the seal cavity may have a plurality of flexible legs projecting from the side of the cavity around the opening from the throughway into the cavity to engage the tapered entry or cam surface in the sleeve and compress the seal radially inwardly as the sleeve is advanced over the legs.

In a still further arrangement the sleeve may have a plurality of fingers projecting axially from the sleeve towards said side of the seal cavity and the cavity is tapered adjacent said side to act on the arms forcing the arms inwardly to compress the seal inwardly onto the cable.

According to a further feature of the invention means may be provided in the cavity to support the seal co-axially with the entry of the throughway into the cavity in said side of the cavity without interfering with the operation of the actuator.

For example the means to support the seal comprise a plurality of spaced webs formed in the cavity around the seal and the actuator has slots to receive the webs as it is advanced over the seal.

In any of the above arrangements means may be provided for advancing the actuator over the seal and retracting the actuator from the seal to engage and release the seal from the cable.

The means for advancing and retracting the sleeve may comprise a bush engaging the sleeve, and means to move the bush in the cavity.

More specifically the means to move the bush may comprise a screw thread engaging an internal thread in the cavity to advance and retract the bush and with it the) sleeve by rotation with respect to the cavity.

Alternatively the bush may have a bayonet connection with the body within the cavity to hold the bush in an advanced position in the cavity in which the seal is compressed against a cable and the end of the cavity.

The actuator may be a friction fit on the seal. However, preferably there are means to retain the actuator in the position in which it compresses the seal.

In one arrangement according to the invention, the seal may be cylindrical and the throughway may have a cylindrical portion adjacent the abutment in which the first part of the seal closely engages and from where the throughway diverges to create a gap between the remainder of the seal and the throughway and the means to retain the actuator is an annular clamping member which has a mouth to engage the end of the annular seal and a tapering bore extending into the clamping member from the mouth with which the seal is engageable as the clamping member moves into the position to compress the seal against the side of the cavity and inwardly to seal with the cable.

More specifically, the means to retain the actuator may have snap fastening means to lock automatically the clamp in a plurality of positions along the throughway.

For example the snap fastening means may comprise annular abutments formed on the outer periphery of the connector facing towards said open end of the connector at spaced locations along the connector and resilient legs extending from the clamp member along the outer side of the connector having heads for snap engaging behind the abutments to lock the clamping member on the coupling body.

In any of the above arrangements sealing means may be provided in the throughway between the open end and said side of the cavity to seal with the outer surface of the conduit inserted into the connector. In one specific arrangement the sealing means may comprise an O-ring seal.

In addition the throughway may have an abutment between the first cavity and the open end also facing the open end against which the O-ring seal is located.

In any of the above arrangements a conduit locking device may be provided in the throughway of the connector adjacent the open end to lock the conduit in the coupling body.

For example the conduit locking device may comprise a collet form locking device having resilient legs for engaging the conduit and a tapering cam surface in the throughway for compressing the legs against the conduit to lock the conduit in the throughway.

Again in any of the above arrangements the cable may be a fibre optic cable.

The connector may have tube couplings at both ends of the hollow body for connection to conduits at both ends with the seal cavity disposed between the couplings.

In any of the above arrangements the or each tube coupling may comprise a collet operated by a tapered cam to receive and lock the end of a conduit for a cable in the connector.

BRIEF DESCRIPTION OF THE DRAWINGS

The following is a description of some specific examples of the invention, reference being made to the accompanying drawings in which.

DETAILED DESCRIPTION OF THE PREFERRED EMBODIMENTS

Figure 1:
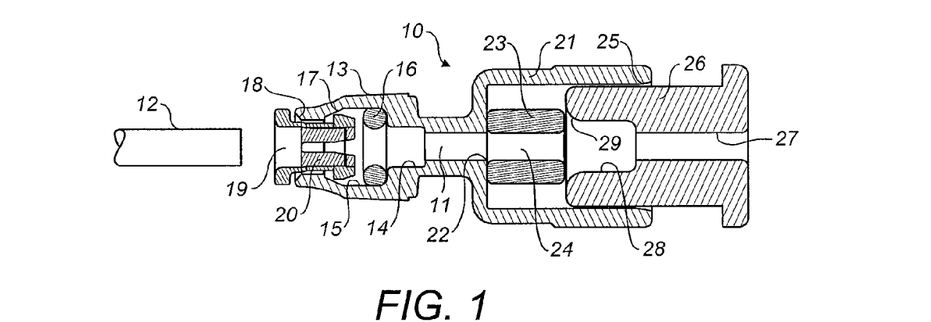
FIG. 1 is a cross-section through a connector of a first example for conduiting for an optical fibre cable showing an end part of a conduit ready for insertion into the connector.

Referring firstly to FIG. 1 of the drawings, there is shown a connector for connection in conduiting for carrying an optical fibre cable comprising a hollow body indicated generally at 10 having a throughway 11 for an optical fibre cable which passes through conduiting, one element of which is indicated at 12. The optical fibre cable is fed through the conduiting by air pressure as described and illustrated in EP-A-0363188. The coupling body 10 has a connector 13 formed integrally at one end of the coupling body to receive the end 12 of the conduit. The throughway 11 in the connector has a first enlarged section 14 to receive the end of the conduit 12, a second enlarged section 15 containing an O-ring seal 16 to seal with the outer surface of the conduit 12 and a tapered section 17 leading to an open mouth 18 in which a collet 19 is located having spring fingers 20 to engage around and secure the conduit 12 in the connector by engaging with and being forced radially inwardly by the tapered cam 17.

The body 10 has an enlarged socket form section 21 at the opposite end to the connector 13 into which the throughway 11 opens at a port 22. A flexible annular seal 23 is mounted in the socket 21 with a passage 24 through the seal aligned with the entry 22.

The socket 21 has an open mouth 25 into which a cylindrical actuator 26 for the seal 23 extends. The actuator has a throughbore 27 and the end of the bore 27 in the socket has an enlarged counter-bore 28 with a flared opening 29 to receive an compress the annular seal 23 inwardly onto an optical fibre cable extending through the body 10 and against the end wall of the socket 21 around the entry 22.

Figure 2:
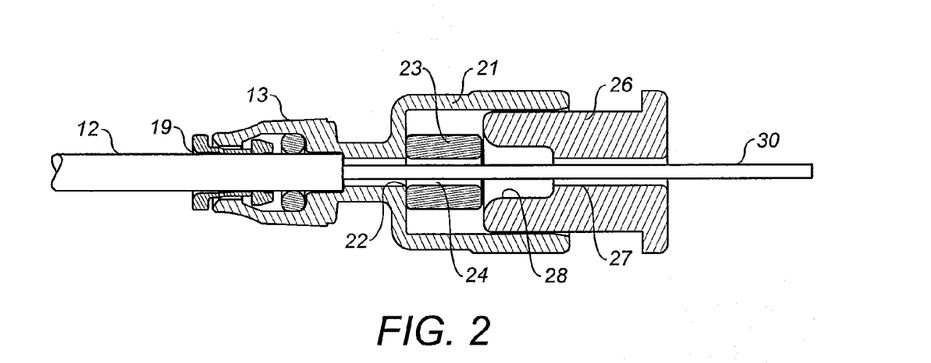
FIG. 2 is a similar view to FIG. 1 except that the conduit is engaged in the connector and an optical fibre is shown extending from the conduit through the sealing device with the sealing device in the non-sealing condition.

In FIG. 2 of the drawings the conduit 12 is shown inserted into the connector 13 and is gripped by the collet 19. An optical fibre cable 30 is shown extending from the conduit 12 along the throughway 11 in the body 10 through the passage 24 in seal 23 and through the bore 27 in the actuator 26.

Figure 3:
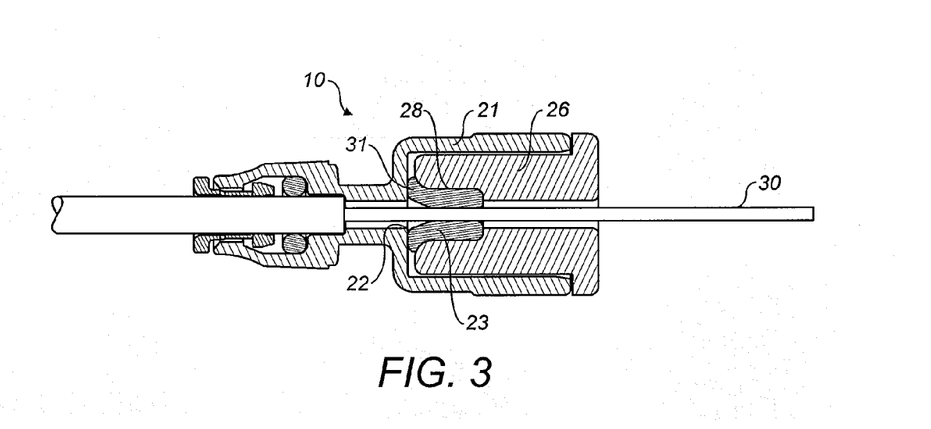
FIG. 3 is a similar view to FIG. 2 except that the sealing device is shown in the sealing condition.
Figure 4:
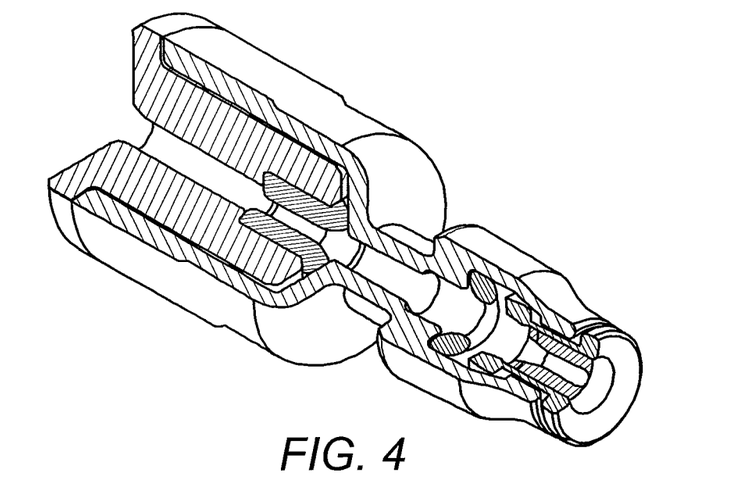
FIG. 4 is a perspective view of the sealing device cut away to show the internal components of the connector.
Figure 5:
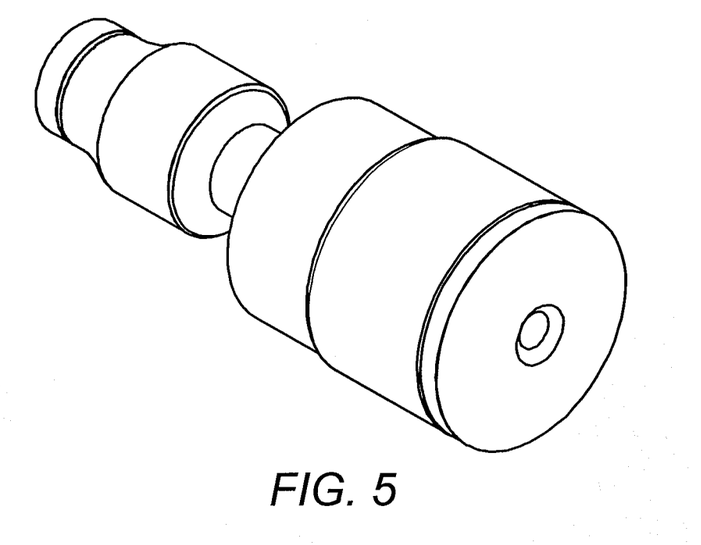
FIG. 5 is a perspective view of the connector showing its full external appearance.

The actuator 26 is pressed into the socket 21 as shown in FIG. 3 and as the counter-bore 28 slides over the annular seal 23, the seal is compressed radially inwardly onto the optical fibre cable 30 and at the same time is compressed against the end wall of the socket 21 around the entry port 22 as indicated at 31. The resulting arrangement provides a gas tight seal between the fibre and the body 10 so that passage of gas is prevented. Thus if a gas leak occurs and the gas enters the conduiting 12 carrying the optical fibre, the gas block prevents the flow of gas beyond the coupling body 10 and therefore prevents gas reaching the building or other installation to which the optical fibre conduiting extends.

The coupling body 10 is shown as a single ended body for connection to a housing or other junction arrangement where the fibre is led to or from a building or other installation. The coupling body can equally be arranged as a double ended coupling body where the connector is required between adjacent lengths of conduiting.

The actuator shown has a simple counter-bore into which the seal fits and collapses. However, this could be tapered, or have an internal feature such as a raised pip or annular rib or may even be of non-circular cross-section such as oval to collapse the seal into an oval if this provides an effective seal with less force. Likewise seal shapes other than the annular sleeve shown can be used. The seal could be of ring form and could have a crowned outer periphery to produce a corresponding internal projection when compressed by the actuator sleeve to seal with the cable.

The actuator need only slide linearly within the body and over the seal. However, different markets/customers may want the product to work in different ways. For example, a 'flag' may be provided that shows the seal is applied when rotated to a certain position. It is not essential to rotate the actuator. Instead a bush may be provided that engages a thread or bayonet on the body that, when rotated, pushes the actuator into the sealing/gripping position.

Figure 6:
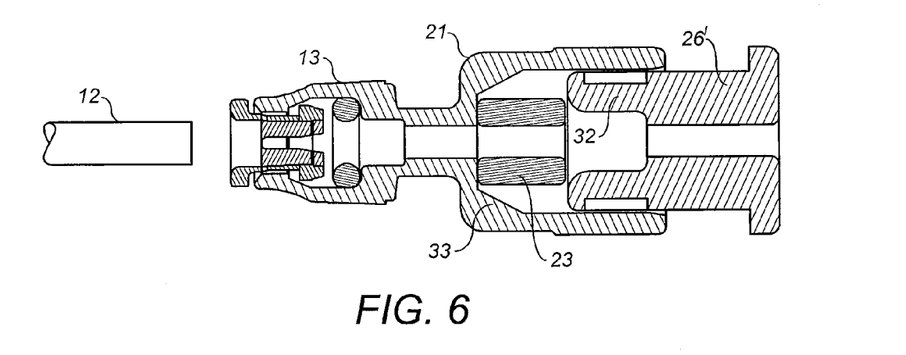
FIG. 6 is a cross-section of a second example.

In the modified arrangement shown in FIG. 6, the end portion of the actuator 26' adjacent the seal 23 comprises axially projecting legs 32 formed with webs along their inner sides which engage in slots in the outer periphery of the seal to centre the seal with respect to the actuator 26'. The corner of the seal cavity between the side wall of the cavity and the outer periphery of the cavity is formed with a taper 33 or angle with which the legs engage to be forced inwardly as the sleeve is advanced in the seal cavity.

Figure 7:
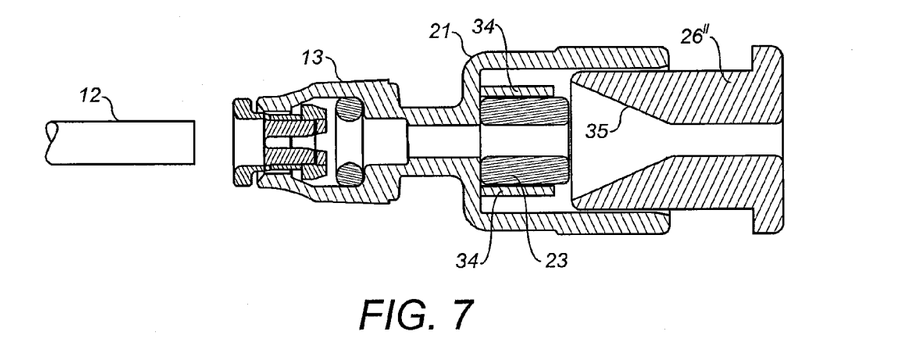
FIG. 7 is a cross-section of a third example.

In the arrangement shown in FIG. 7, the seal is located with respect to the opening from the throughway into the seal cavity by flexible legs 34 projecting from the side of the seal cavity around the seal. The sleeve for compressing the seal has a taper 35 or cam rather than a counter-bore as described previously for engaging and pressing the legs inwardly to compress the seal radially inwardly onto the optical fibre cable. The arrangement is otherwise similar to that described above.

The actuator may have slots the same length as the counter-bore. This is simply to allow clearance for webs in the body which are designed to keep the seal concentric prior to sealing.

The primary benefits of this design are:
Compact, short design
The seal remains static—it seals and grips the fibre without moving it or putting it under strain.

A fourth example will now be described with reference to FIGS. 8 to 10.

The main differences compared to previous examples are that instead of the cavity in the connector the connector is formed with a short cylindrical cavity 40 terminating in an end face 41 into which the throughway 11 opens at 22. The cylindrical cavity 40 has a long tapered entry 42 which terminates in an enlarged opening 43 into the bore. The tapering entry 42 forms a tapering wedge cross-section gap between the entry and the outer periphery of the annular seal 23.

Figure 8:
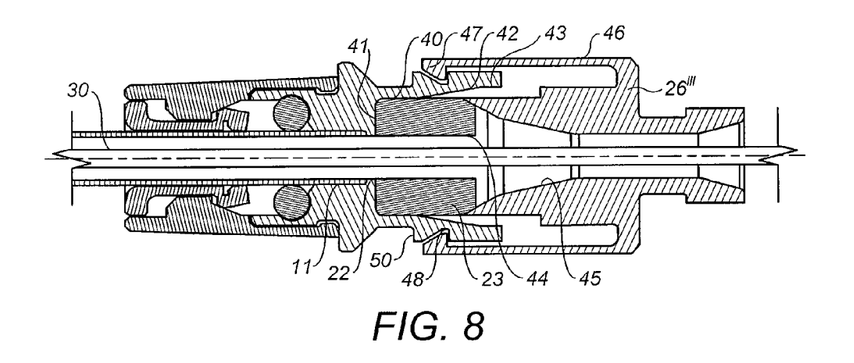
FIG. 8 is a cross-section through a fourth example of a connector, a conduit having an end locked in the connector and an optical fibre cable extending through the conduit and through the connector with an annular seal for sealing the optical fibre to the connector.

The seal 23 has an inner diameter 44 which in the position shown in FIG. 8 is comparable in diameter to the entry 22 of the throughway 11 into the bore to provide a generally flush surface through which the optical fibre cable 30 can be propelled when it is installed in the conduiting as described in our earlier application.

The actuator 26''' for the seal is of annular form and has a long tapered entry 45 which terminates in a mouth shaped to engage the end of the seal 23 projecting from the bore. The actuator 26''' is supported on the connector body by axially extending legs 46 at spaced locations around the actuator and formed with inwardly projecting heads 47 to engage in a groove 48 in the outer surface of the connector when the actuator is in its retracted position and to engage over an annular abutment 50 spaced along the connector from the groove when the actuator is moved into an advanced position along the connector body as shown in FIGS. 9 and 10.

Particularly in small versions of the fitting the legs 46 may be formed integrally at their free ends with an annular ring to provide support for the legs. The legs can be released from the abutments/grooves by pressing the parts of ring between the legs inwardly making the ring go into an oval shape to assist in lifting the heads 47 from the groove or abutments. Buttons can be formed on the ring between the legs to assist in depressing the ring.

Figure 9:
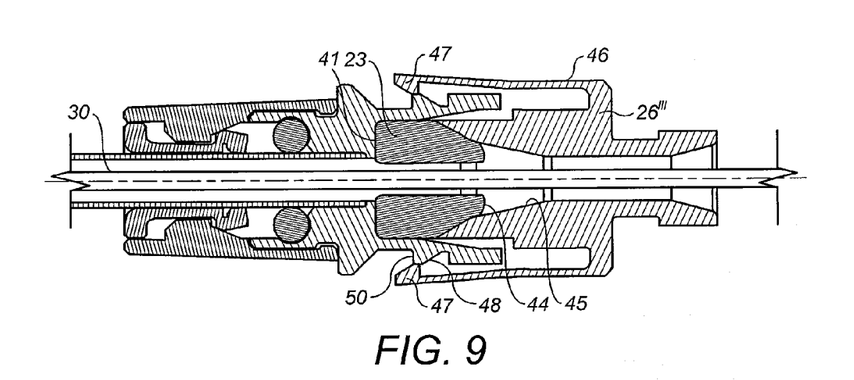
FIG. 9 is a similar view to FIG. 8 showing an axially operating annular clamping device for the annular seal partially compressing the seal axially to cause the seal to be pressed radially inwardly around the optical fibre cable.
Figure 10:
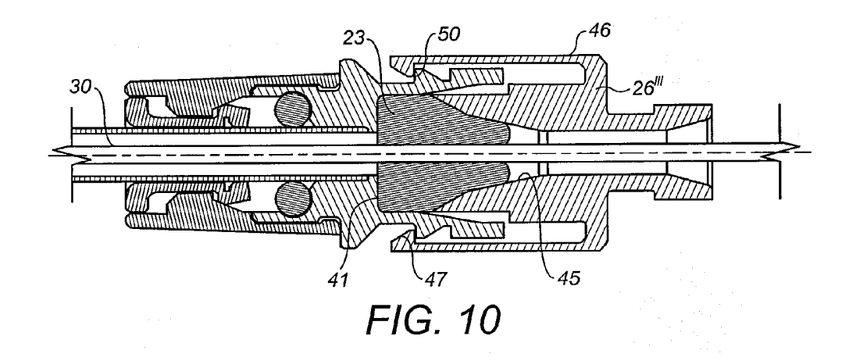
FIG. 10 is a similar view to FIGS. 8 and 9 in which the annular seal is pressed by the annular clamping member into sealing engagement with the optical fibre cable and into a face of the connector body to prevent fluids (gases or liquid) passing into or out of the cable carrying conduit.
Figure 11:
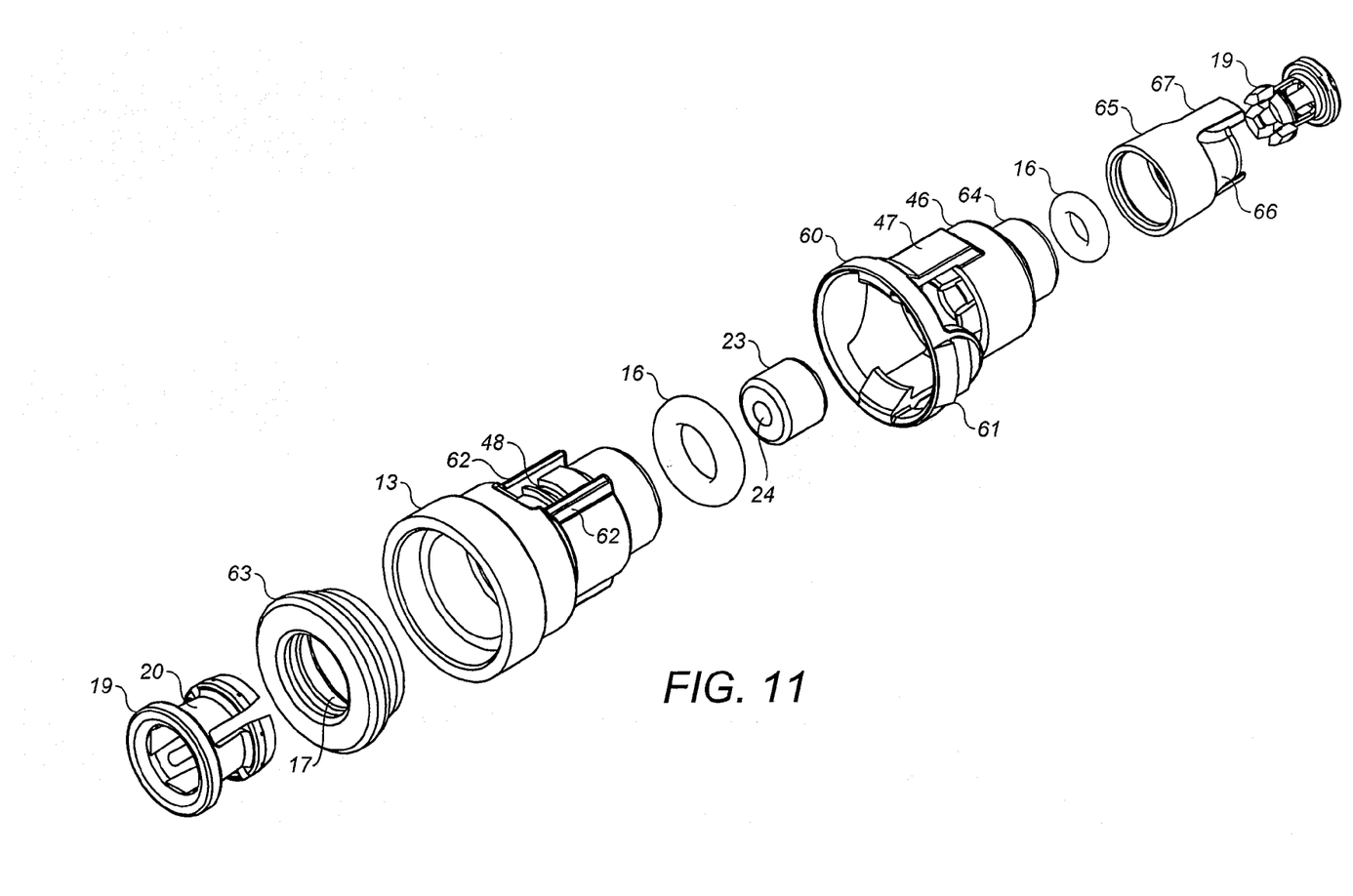
FIG. 11 is an exploded perspective view of a fifth example.
Figure 12:
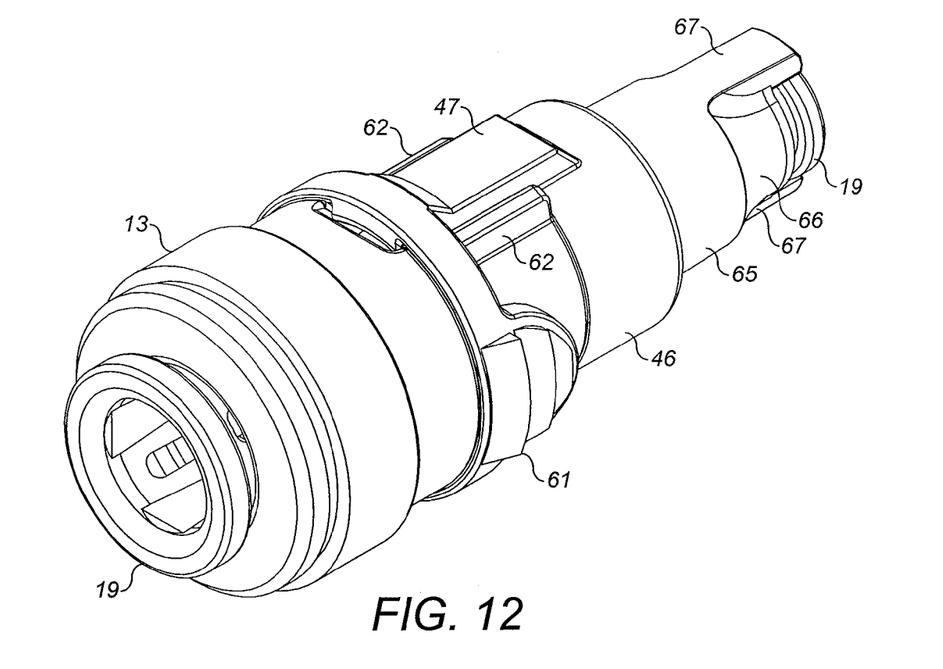
FIG. 12 is a similar view to FIG. 11 showing the components assembled.
Figure 13:
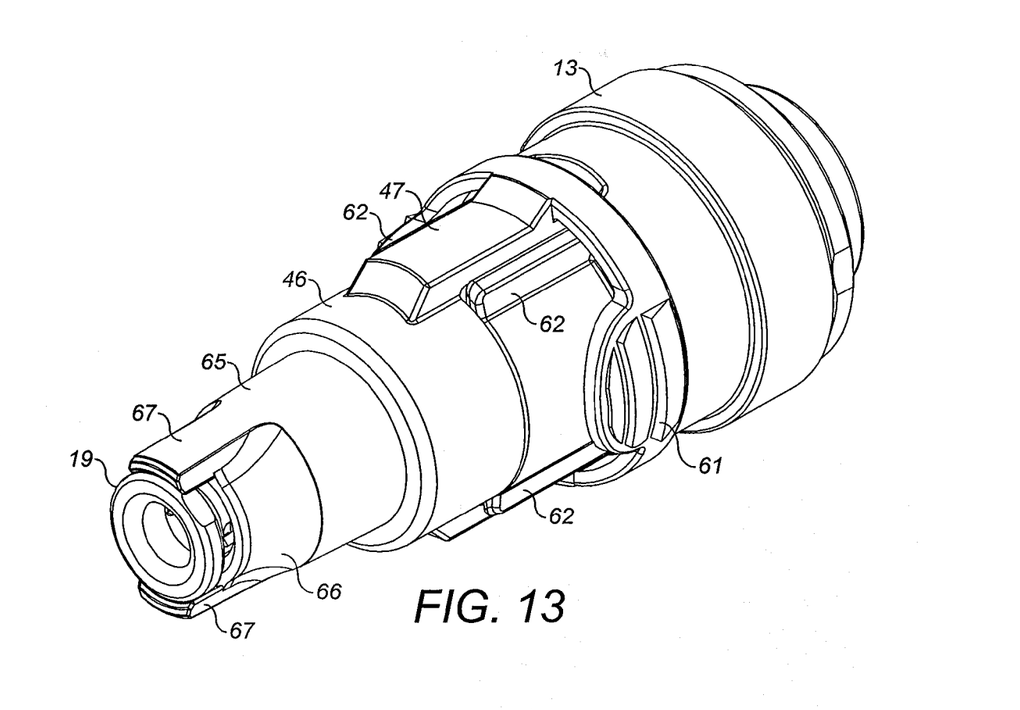
FIG. 13 is a perspective view from the opposite end to FIG. 12.
Figure 14:
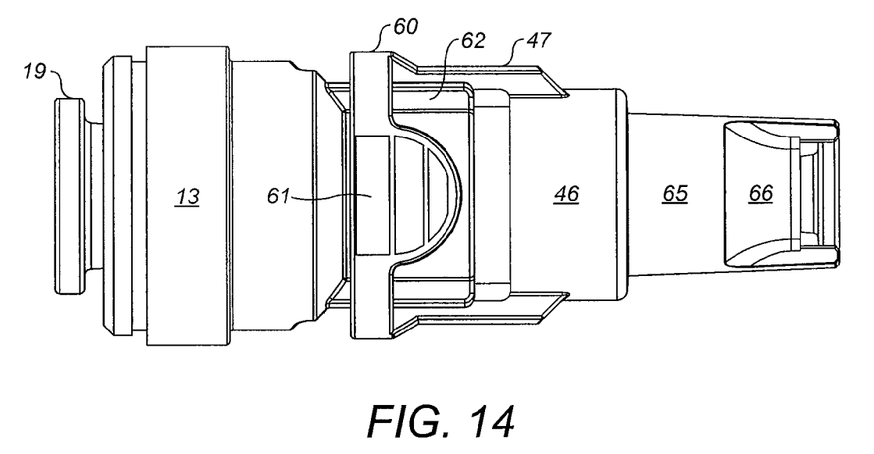
FIG. 14 is a side view of the fifth example with the ring not fully advanced.
Figure 15:
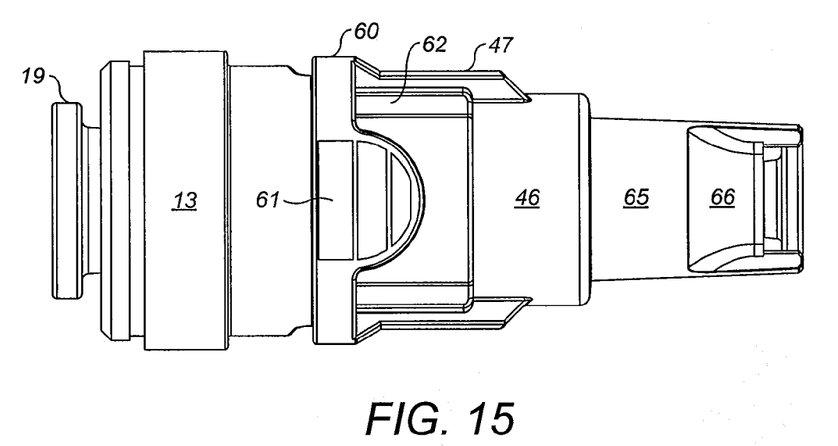
FIG. 15 is a view similar to FIG. 14 with the ring fully advanced.

In the partially advanced position shown in FIG. 9, the open end of the actuator has engaged the annular seal and started deforming the material at the seal radially inwardly towards the optical fibre cable and in so doing forcing the material of the seal down into the tapered mouth of the actuator. As the mouth of the actuator is advanced further along the outer surface of the seal, the actuator acting on the seal also forces the seal against the side 41 of the cavity to create gas or fluid seals between the seal and the side wall 41 of the cavity and between the seal and the optical fibre cable ensuring that gas or fluid cannot leak from the conduit past the seal and out of the connector or flow in the reverse direction into the conduit. In this position as shown in FIG. 10, the heads of the resilient legs of the actuator have snapped over the annular abutment 50 to lock the actuator in the forward/sealing position.

A fifth example is shown in FIGS. 11 to 15 which show a further modified form of the coupling of the fourth example and like parts have been allotted the same reference numerals. The connector of FIGS. 11 to 14 is double ended as opposed to the single ended connector described previously to enable dual lengths of conduit to be secured together end to end. There is an optical fibre extending through the conduits and the connector bridging the conduits. In the example shown in FIGS. 8 to 10 described above, reference was made to an annular ring formed integrally with the legs 47 to provide support for the legs and to enable the legs to be released from the abutments/grooves in the coupling body by pressing the parts of the ring between the legs inwardly and thereby making the ring go into an oval shape to lift the heads 47 from the grooves. The ring is shown at 60 in FIGS. 11 to 14 and the buttons on the ring are shown at 61. Buttons are formed on the ring between the legs to indicate the optimum positions for depressing the rings.

The main body of the coupling has two sets of grooves 48 formed diametrically opposite space locations on the external surface of the body, each set of grooves being located between a pair of longitudinally extending abutments 62 which form a channel to receive the leg 47 on the other part of the body.

At one end of the main part of the body, there is an enlarged annular socket 13 in which an annular ring 63 is secured by ultrasonic welding. The ring is formed internally with the tapered cam surface 17 with which the heads of the collet 19 engage to press the heads into gripping engagement with the tube extending through the collet. At the other end of the connecting body the body is stepped down in diameter as indicated at 64 and a sleeve 65 is secured by ultrasonic welding to the reduced diameter portion of the body. The sleeve is formed with a tapered end 66 providing a tapered cam surface in which the legs of the collet 19 are located to grip and secure a tube in place. The sleeve also has a pair of axially extending integral fingers 67 between which the head of the collet engages to support the collet in the coupling body.

What is claimed is:

1. A connector for connecting a conduit and a cable, the connector comprising:
   a hollow body having an axial throughway for the cable with a coupling for a conduit at least at one end of the body and a cavity in the body having a side substantially transverse to the throughway through which the throughway opens into the cavity;
   an annular seal axially spaced apart from the coupling and having an outer diameter, the annular seal being located in the cavity adjacent to the side of the cavity and being co-axial with the throughway for the cable to allow the cable to pass through the seal when the seal is unstressed; and
   an actuator located in the cavity for axial movement toward and away from the side of the cavity, the actuator having means for acting on the annular seal to compress the seal radially inwardly into engagement with the cable and to force the seal against the side of the cavity with movement towards the side to block flow of fluid through the cavity and/or to grip the cable; wherein the actuator comprises a sleeve having a bore to receive the seal when the sleeve is advanced toward the side of the cavity, the bore having an inner diameter that is less than the outer diameter of the seal to compress the seal onto the cable and against the side of the cavity.

2. A connector according to claim 1, further comprising means for retaining the actuator in the position in which it compresses the seal.

3. A connector as claimed in claim 1, wherein the bore in the sleeve is cylindrical and has a counter-bore at the end adjacent the seal to receive and compress the seal.

4. A connector as claimed in claim 3, wherein the counter-bore in the sleeve has a flared entry to guide the seal into the counter-bore in the sleeve.

5. A connector as claimed in claim 1, wherein the bore in the sleeve has a tapered entry or cam face to compress the seal inwardly on engagement in the bore.

6. A connector as claimed in claim 5, wherein the seal cavity has a plurality of flexible legs projecting from the side of the cavity around the opening from the throughway into the cavity to engage the tapered entry or cam surface in the sleeve and compress the seal radially inwardly as the sleeve is advanced over the legs.

7. A connector as claimed in claim 1, wherein the sleeve has a plurality of fingers projecting axially from the sleeve towards said side of the seal cavity and the cavity is tapered adjacent said side to act on the fingers forcing the fingers inwardly onto the cable.

8. A connector as claimed in claim 1 wherein means are provided in the cavity for supporting the seal co-axially with the entry of the throughway into the cavity in said side of the cavity without interfering with the operation of the actuator.

9. A connector as claimed in claim 8, wherein the means for supporting the seal comprises a plurality of spaced webs formed in the cavity around the seal and the actuator has slots to receive the webs as it is advanced over the seal.

10. A connector as claimed in claim 1, wherein means are provided for advancing the actuator over the seal and retracting the actuator from the seal to engage and release the seal from the cable.

11. A connector as claimed in claim 10, wherein the means for advancing and retracting the sleeve comprise a bush engaging the sleeve, and means for moving the bush in the cavity.

12. A connector as claimed in claim 11, wherein the means for moving the bush comprises a screw thread engaging an internal thread in the cavity to advance and retract the bush and with it the sleeve by rotation with respect to the cavity.

13. A connector as claimed in claim 11, wherein the bush has a bayonet connection with the body within the cavity to hold the bush in an advanced position in the cavity in which the seal is compressed against a cable and the end of the cavity.

14. A connector as claimed in claim 1, having tube couplings at both ends of the hollow body with the seal cavity disposed between the couplings.

15. A connector as claimed in claim 14, wherein the or each tube coupling comprises a collet operated by a tapered cam to receive and lock the end of a conduit for a cable in the connector.

16. A connector as claimed in claim 2, wherein the seal is cylindrical and the throughway has a cylindrical portion adjacent the abutment in which the first part of the seal closely engages and from where the throughway diverges to create a gap between the remainder of the seal and the throughway and the means to retain the actuator is an annular clamping member which has a mouth to engage the end of the annular seal and a tapering bore extending into the clamping member from the mouth with which the seal is engageable as the clamping member moves into the position to compress the seal against the side of the cavity and inwardly to seal with the cable.

17. A connector as claimed in claim 2, wherein the means for retaining the actuator has snap fastening means for locking automatically the clamp in a plurality of positions along the throughway.

18. A connector as claimed in claim 17, wherein the snap fastening means comprise:
   annular abutments formed on the outer periphery of the connector facing towards said open end of the connector at spaced locations along the connector; and
   resilient legs extending from the clamping member along the outer side of the connector having heads for snap engaging behind the abutments to lock the clamping member on the coupling body.

19. A connector as claimed in claim 1, wherein sealing means are provided in the throughway between the open end and said side of the cavity for sealing with the outer surface of the conduit inserted into the connector.

20. A connector as claimed in claim 19, wherein the sealing means comprise an O-ring seal.

21. A connector as claimed in claim 20, wherein the throughway has an abutment between the cavity and the open end also facing the open end against which the O-ring seal is located.

22. A connector as claimed in claim 1, wherein a conduit locking device is provided in the throughway of the connector adjacent the open end to lock the conduit in the coupling body.

23. A connector as claimed in claim 22, wherein the conduit locking device comprises:
   a collet form locking device having resilient legs for engaging the conduit; and a tapering cam surface in the throughway for compressing the legs against the conduit to lock the conduit in the throughway.

24. A connector as claimed in claim 1, wherein the cable is a fibre optic cable.

25. A connector for connecting a conduit and a cable, the connector comprising:
- a hollow body having an axial throughway extending therethrough from a first end to an opposing second end, a coupling disposed at the first end of the body and a cavity disposed at the second end of the body, the cavity having a side surface through which the throughway opens into the cavity;
- a tubular seal disposed within the cavity adjacent to the side surface so as to be co-axial with the throughway, the tubular seal being spaced apart from the coupling;
- a conduit at least partially disposed within throughway of the body and secured to the coupling;
- a cable projecting out of the conduit and through the tubular seal; and
- an actuator located in the cavity, the actuator comprising a sleeve having a bore configured to receive the seal, the actuator being configured such that as the actuator is moved toward the side surface of the cavity, at least a portion of the seal is received within the bore causing the seal to compress radially inward into direct engagement with the cable and the seal is forced in sealing engagement against the side surface of the cavity.

26. A connector as claimed in claim 25, wherein the throughway of the body has a central longitudinal axis passing therethrough and the side surface of the cavity is disposed in a plane that extends normal to the central longitudinal axis.

27. A connector as claimed in claim 25, wherein the cable is a fibre optic cable.

* * * * *